(12) United States Patent
Venkata Naga Ravi

(10) Patent No.: US 8,528,099 B2
(45) Date of Patent: Sep. 3, 2013

(54) POLICY BASED MANAGEMENT OF CONTENT RIGHTS IN ENTERPRISE/CROSS ENTERPRISE COLLABORATION

(75) Inventor: Kiran Vedula Venkata Naga Ravi, Belmont, CA (US)

(73) Assignee: Oracle International Corporation, Redwood City, CA (US)

( * ) Notice: Subject to any disclaimer, the term of this patent is extended or adjusted under 35 U.S.C. 154(b) by 262 days.

(21) Appl. No.: 13/015,220

(22) Filed: Jan. 27, 2011

(65) Prior Publication Data
US 2012/0198559 A1  Aug. 2, 2012

(51) Int. Cl.
*G06F 21/00* (2013.01)

(52) U.S. Cl.
USPC ...... 726/26; 726/1; 726/6; 713/153; 713/165; 713/167

(58) Field of Classification Search
USPC .................... 726/1, 6, 26; 713/153, 165, 167
See application file for complete search history.

(56) References Cited

U.S. PATENT DOCUMENTS

| 6,324,551 | B1* | 11/2001 | Lamping et al. ............... 715/229 |
| 6,421,691 | B1* | 7/2002 | Kajitani ........................ 715/234 |
| 6,871,276 | B1 | 3/2005 | Simon |
| 7,627,827 | B2 | 12/2009 | Taylor et al. |
| 7,757,299 | B2 | 7/2010 | Robert et al. |
| 2002/0077986 | A1* | 6/2002 | Kobata et al. .................. 705/52 |
| 2005/0240572 | A1* | 10/2005 | Sung et al. ........................ 707/3 |
| 2007/0174627 | A1* | 7/2007 | Teijido et al. ................. 713/182 |
| 2007/0180084 | A1* | 8/2007 | Mohanty ...................... 709/223 |
| 2008/0294895 | A1 | 11/2008 | Bodner et al. |
| 2008/0301757 | A1* | 12/2008 | Demarest et al. ................. 726/1 |
| 2008/0313699 | A1 | 12/2008 | Starostin et al. |
| 2009/0060181 | A1 | 3/2009 | Eye et al. |
| 2009/0259591 | A1 | 10/2009 | Starostin et al. |
| 2009/0319529 | A1 | 12/2009 | Bartlett et al. |
| 2010/0169667 | A1 | 7/2010 | Dewan |
| 2010/0180332 | A1 | 7/2010 | Ben-Yochanan et al. |
| 2011/0296291 | A1* | 12/2011 | Melkinov et al. ............. 715/229 |

FOREIGN PATENT DOCUMENTS

| EP | 0697662 A1 * | 8/1994 |
| WO | WO 02/101494 A2 * | 12/2002 |

OTHER PUBLICATIONS

"Managing Access to Content Across a Distributed Enterprise-Strategies for improving Content infrastructure in a Global Enterprise", EMC, Oct. 3, 2006.*
"EMC Documentum Portlets—Powering today's business processes through a portal", EMC, 2004.*
"EMC Doumentum Architecture: Delivering the Foundations and Services for Managing Content Across the Enterprise—A Detail Review", EMC, Jan. 2008.*

(Continued)

*Primary Examiner* — Kambiz Zand
*Assistant Examiner* — Tongoc Tran
(74) *Attorney, Agent, or Firm* — Marsh Fischmann & Breyfogle, LLP; Jonathon A. Szumny

(57) ABSTRACT

Systems, methods and apparatuses (i.e., utilities) for use in managing access to and use of artifacts (e.g., word or pdf documents, jpegs, and the like) and any copies thereof in an enterprise/cross-enterprise environment. The utility may include a content management system for storing the artifacts and managing use of the artifacts and an information rights management system for use in sealing the artifacts, validating users and granting licenses for use of the artifacts at the directive of the content management system.

20 Claims, 8 Drawing Sheets

(56) References Cited

OTHER PUBLICATIONS

Gasmi, Yacine, et al., "Flexible and Secure Enterprise rights management based on trusted virtual domains," Conference on Computer and Communications Security Proceedings of the 3rd ACM workshop on Scalable trusted computing, pp. 71-80, year of Publication: 2008; ISBN: 978-1-60558-295-5, Abstract.

Sandhu, Ravi, et al., ASIAN ACM Symposium on Information, Computer and Communications Security Proceedings of the 2006 ACM Symposium on Information, computer and communications security, Taipei Taiwan, pp. 2-12, Year of publication 2006, ISBN: 1-59593-272-0, Abstract.

* cited by examiner

POLICY BASED MANAGEMENT OF CONTENT RIGHTS IN ENTERPRISE/CROSS ENTERPRISE COLLABORATION

BACKGROUND

1. Field of the Invention

The present invention generally relates to content and information rights management, and more particularly to systems and methods that allow the enforcement of organizational and regulatory policies in relation to content irrespective of content location.

2. Relevant Background

Document or content management systems (DMS or CMS) generally include the collection of procedures (e.g., manual, computer-based) used to manage work flow in a collaborative environment (e.g., intra-business, business to business collaboration). DMS and CMS can allow for a large number of people to contribute to and share stored data (e.g., emails, documents, movies, pictures, phone numbers, scientific data). DMS and CMS can provide various functions such as aiding in the easy storage and retrieval of data, reducing repetitive duplicate inputs, and the like. As a CMS can serve as a central repository for content and files in various directories and folders, a CMS can increase the version level of new updates to an already existing file.

For example, Enterprise Content Management (ECM) is a formalized means of organizing and storing an organization's documents and other content that relate to the organization's processes ECM is primarily aimed at managing the life-cycle of information from initial publication or creation all the way through archiving and eventually disposal. ECM applications can be delivered via on-premise software (e.g., installed on the organization's own network), software as a service (SaaS) (web access to information that is stored on the software manufacturer's system), hybrid solutions composed of both on-premise and SaaS components, and the like. ECM aims to make the management of corporate information easier through simplifying storage, security, version control, process routing, and retention.

In conjunction with CMSs, enterprise administrators often implement Information Rights Management (IRM) systems (e.g., Enterprise Rights Management, Enterprise Digital Rights Management (DRM), Document Rights Management, Intelligent Rights Management, or the like) to track use of and limit unauthorized access to the content both inside (e.g., while the document is stored on a server-side repository) and outside of one or more networks (e.g., outside of an organization's firewall on a personal desktop, laptop, or mobile device). IRM technology can "follow" a document (in addition to all subsequent copies of the document) both inside and outside of an organization to ensure that users have only those types of access specified by the document creator or other administrator of the organization. That is, IRM systems often use persistent usage policies that remain with the document or content even after the information is transferred between entities, servers, and the like, and may be used to protect many types of information such as financial data, intellectual property, executive communications and the like. In contrast, shared secret passwords associated with documents merely address an "allow/deny" (e.g., all or nothing) policy that, if obtained by unauthorized users, can allow full access and manipulation to the documents IRM technologies often allow for several levels of security. Some of the functionality offered by IRM systems includes industry standard encryption of the information (e.g., utilizing Rivest, Shamir and Adleman (RSA), Advanced Encryption Standard (AES), etc.), use protection such as controlling copy and paste, preventing screen shots and printing, offline use that allows users to create/access documents without needing network access for certain periods of time (e.g., 4 hours), auditing various types of access and/or changes to documents, just to name a few.

As an example, consider a chief executive officer (CEO) who wishes to send an email message containing sensitive information about a forthcoming reorganization to his or her executive staff. Using an information rights management system enabled email application, such as those currently known, the CEO selects a template to specify that recipients may read the email message for a particular period of time, but not copy, paste, edit or forward that message (i.e., the CEO specifies various "permissions"). Upon receipt, the recipients may view the message using the email application during the particular time period (e.g., 4 hours). After the time period has expired, the recipients would no longer be able to view the email. These types of restrictions can also be applied to intranet content and electronic documents using known IRM systems.

SUMMARY

While current IRM systems and solutions provide some level of management of content and copies thereof both inside and outside of organizations, they are typically merely applied "on top" of the content (i.e., they are "lightweight" solutions) and thus are oblivious to the actual source of the content. It has thus been determined that a CMS should be the "true owner" of all content associated with an enterprise, both throughout the entire lifecycle of the content and irrespective of a location of the content (e.g., within the enterprise's network, offline on a personal computing device, and the like). In this regard, various decisions such as when/whether to seal an artifact, what types of artifact use/access permissions (e.g., read-only, printing) a user is to be afforded, and the like should be made centrally from the CMS and thereafter applied to all copies of the artifact wherever such copies reside. Thus, any type of IRM system(s) utilized with the CMS would default to the CMS in relation to making decisions as to whether a particular user has one or more particular types of access to one or more particular documents (and all subsequent copies) for one or more particular periods of time.

Moreover, as CMS and IRM systems are typically separately integrated into an enterprise's infrastructure, they are thus unaware of updates occurring on the other system (i.e., the IRM system may be unaware of updates occurring on the CMS and vice versa). For instance, imagine a user (e.g., an employee of an organization) properly accessing a document via an IRM system, and then forwarding an email with the document to a personal email account (e.g., situated on a network outside of the organization). Upon termination from the organization, the organization's corporate directory (part of or in communication with a CMS) may be updated to reflect the "ex-employee" status of the user (e.g., indicate that the user is now not authorized to access the particular document). However, the IRM system(s) responsible for monitoring for unauthorized access to the document may not receive the updated status of the user and thus may continue to illicitly grant/allow access to the document by the employee. It has thus been determined that it would be advantageous to provide mapping of information between a CMS and one or more IRM system(s) so that the IRM system(s) can implement and execute user/access policies created and/or mandated by or at the CMS.

As will be discussed herein, the present systems, apparatuses, computer-readable mediums, methods, and the like ("utilities") can allow administrators and content owners to centrally and dynamically grant, deny and modify various types of access to content and at least substantially all of their copies anywhere such content and copies reside through use of a content management system instead of having to separately implement and administer both a CMS and one or more IRM systems. For instance, enterprise users may, via using the systems and methods disclosed herein have access to various workspaces associated with a CMS that allows users to collaborate and share information and content with other users, coordinate team activities, create team wikis, etc. Upon creation of a document, the document creator/user may locate the original version/copy of the document within the user's personal workspace or within a personal folder on the enterprise's CMS. Instead of having to separately coordinate with one or more IRM system administrators to appropriately encrypt the document to limit use of the document by others, the document (and/or any copies of the document) automatically becomes inaccessible to others by virtue of the document being located in the user's personal workspace. Thus, any copies of the document somehow obtained and emailed to others may be automatically inaccessible owing to the interaction of the various systems, functions, and aspects discussed herein. As another example, the user/document creator could provide "read-only" access of the document to team members by moving the original document from the user's personal workspace to a team workspace and specifying "read-only" access to team members. As a further example, the user could globally provide reading and printing access to the document or any other variations of access at various times throughout the lifecycle of the document as will be discussed herein.

Accordingly, utilities discussed herein can enforce not only access to an "artifact" (i.e., a piece of content of interest to a user or group of users, such as documents, emails, photos, spreadsheets, reports, HTML web pages, and the like) stored within a CMS, but also access to at least substantially all copies of the artifact located anywhere else. Accordingly, organizations can efficiently govern access to various types of artifacts such as requiring execution of a non-disclosure agreement (NDA), revoking or granting various types of access, and the like, while limiting the degree to which system administrators need to manually engage in revoking, granting and/or modifying access to artifacts and/or their copies.

In one aspect, a method for use in a content management system (CMS) includes providing a CMS including at least one workspace, the at least one workspace including at least one folder for storing artifacts; selecting, from the CMS, at least one sealing policy that mandates encryption of at least one artifact of the CMS upon the at least one sealing policy being satisfied; disposing an artifact in the at least one folder; determining, with a policy manager associated with a processor on a computer system whether the at least one sealing policy has been satisfied; and sending, from the CMS, a request to an information rights management (IRM) system to seal the artifact in response to a determination that the at least one sealing policy has been satisfied.

In another aspect, a method for use with a content management system (CMS) includes receiving, at an information rights management (IRM) server, a request for access to an artifact from a user at a client device or system, the request including a user ID of the user and a unique identifier of the artifact; validating that the user ID is associated with a user in an enterprise directory of a CMS; forwarding, from the IRM server, the user ID and the unique identifier to the CMS; receiving, from the CMS, information related to at least one type of use of the artifact and/or at least one condition that must be satisfied for the at least one type of use associated with the user ID; generating a license for use of the artifact with the artifact, the license associating the first information with the user ID and the unique identifier; and forwarding, from the IRM server, the license to the client device.

In another aspect, a content management system (CMS) for use in granting access to an artifact of an enterprise includes a processor; a content management module run by the processor, the content management module including at least one workspace, the at least one workspace including at least one folder for storing artifacts, at least one sealing policy that mandates encryption of at least one artifact of the at least one workspace by an information rights management (IRM) system upon the at least one sealing policy being satisfied, and at least one permission that sets forth at least one type of use of at least one sealed artifact of the at least one workspace by one or more users of the enterprise.

In addition to the exemplary aspects and embodiments described above, further aspects and embodiments will become apparent by reference to the drawings and by study of the following descriptions.

DETAILED DESCRIPTION

Figure 1:
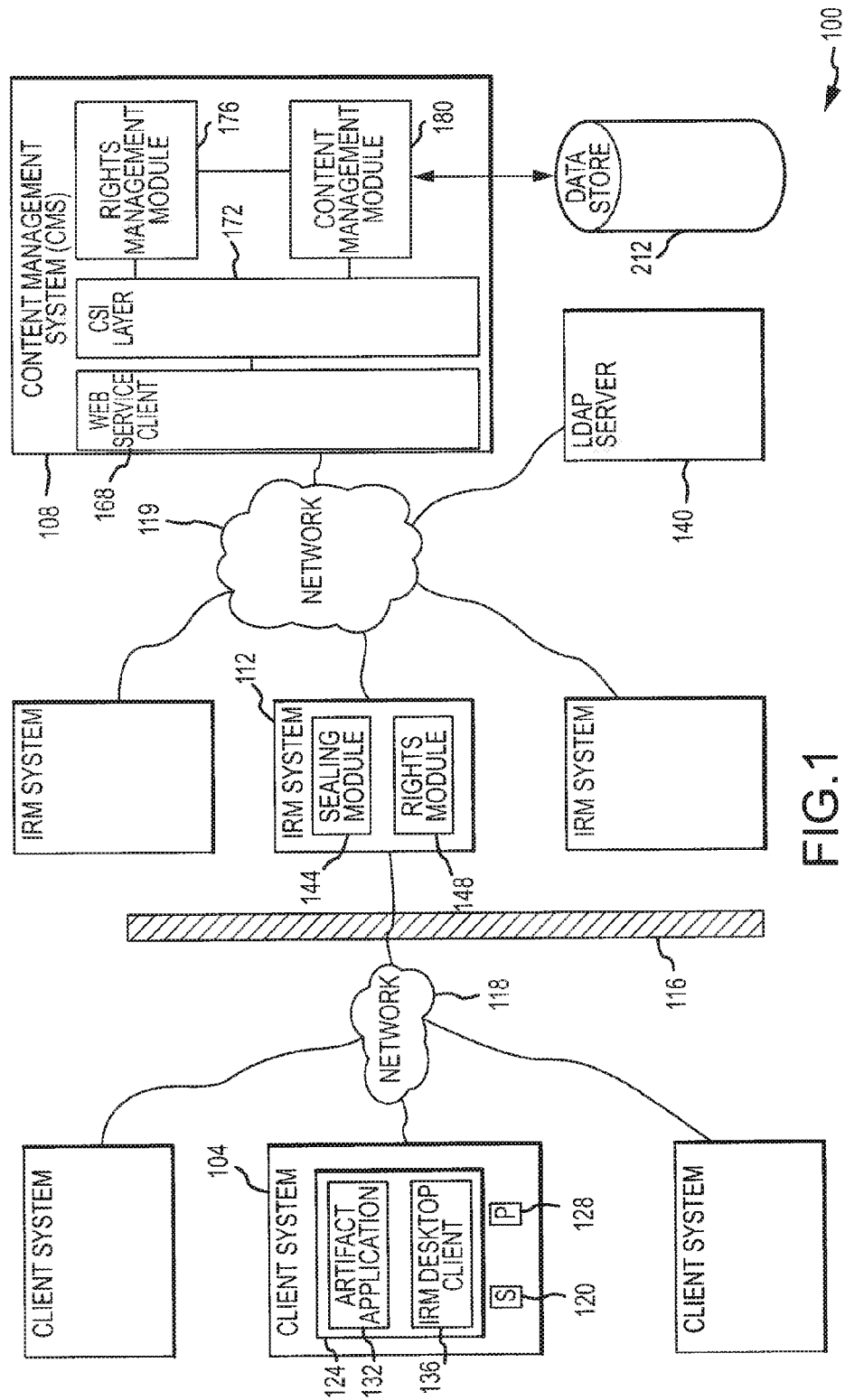
FIG. 1 is a functional block diagram of a system including a content management system (CMS) that may be used to centrally administer artifact or content sealing policies and usage permissions in conjunction with one or more information rights management (IRM) systems.

FIG. 1 is a functional block diagram of a system 100 including a CMS 108 that may be used to centrally administer "sealing policies" and "usage permissions" in relation to "artifacts" behind an enterprise firewall 116 in conjunction with one or more IRM systems 112 and one or more client systems 104. The following definitions will be used herein:

An "artifact" is an object or piece of content that may be of interest to a user or group of users, such as a document, email, photo, spreadsheet, report, HTML web page, and the like.

A "license" refers to an object created by or at the direction of an IRM system that incorporates one or more specific permissions afforded to a particular user in relation to a sealed artifact. A license may also include a content key for decrypting a sealed artifact. In some situations, the license itself may be encrypted with any appropriate key.

A "permission" refers to a particular type of access or use afforded to a user in relation to a sealed artifact (e.g., read-only, editing, printing of the artifact) or in relation to a workspace component such as a workspace folder (e.g., access to one or more particular workspace folders). For instance, artifact permissions may be associated with a user ID/artifact unique identifier combination and stored in any appropriate data store for use by system components in responding to sealed artifact access requests. In some instances, prerequisites/conditions that must be satisfied before a sealed artifact or workspace folder can be used or accessed may be specified.

A "policy" or "sealing policy" refers to the set of circumstances under which an artifact is to be sealed by the IRM system 112 at the directive of CMS 108. For instance, a sealing policy may be in the form of an "if/then" type statement or rule processed by the CMS 108; whereby, if an artifact is disposed into a particular folder in a workspace of the CMS 108, then the CMS 108 issues a command, directive or message to the IRM system 112 to seal the artifact.

"Sealing" refers to the process of encrypting an artifact with a reversible encryption mechanism. Sealing may also include embedding one or more pieces of metadata into the artifact, and modifying the file extension of the artifact to reflect the sealing (e.g., from patent.doc to patent.sdoc).

A "sealed artifact" is an artifact that has been sealed.

As will be appreciated throughout this discussion, the various utilities discussed herein can allow a CMS of an enterprise or other organization to function or operate as the "true owner" of all artifacts (and any copies thereof) associated with the enterprise, both throughout the entire lifecycle of the artifact and irrespective of the location of the artifact (within the enterprise's network, offline on a personal computing device, or elsewhere). In one embodiment, and in contrast to previous IRM systems and arrangements, the present disclosure contemplates that usage permissions may not be attached and/or may not "follow" artifact copies that are transferred or sent inside or outside the enterprise network. That is, each time user desires to access and use an artifact that is sealed under the teachings of the present disclosure, the user may be required to make appropriate contact with the CMS which determines current usage permissions in relation to the user and transmits such permissions back to the user, as will be discussed herein (i.e., instead of the user being able to access and open the artifact in isolation from the CMS). In this regard, any type of IRM system(s) utilized with the CMS would default to the CMS in relation to making decisions as to whether a particular artifact should be sealed, whether a particular user has one or more particular types of access to one or more particular sealed artifacts (and all subsequent copies) for one or more particular periods of time, whether one or more conditions have been satisfied before the user is allowed access to the sealed artifact, and the like.

This arrangement allows an enterprise administrator to globally manage (i.e., administer) sealing policies and use permissions of enterprise artifacts while allowing one or more IRM systems to actually implement and carry out the sealing of artifacts and the generation of licenses that allow the various access and use permissions (i.e., at the directive of the CMS). As a result, content owners and administrators and policy makers can automatically apply and enforce policies that govern access mechanisms (e.g., word processing programs) to enterprise-owned artifacts distributed both inside and outside the enterprise through one or more communication channels. Furthermore, usage permissions can be created, modified and/or rescinded dynamically throughout the lifecycle of the sealed artifact which may then be "automatically" applied to the sealed artifact. For instance, upon a user attempting to open a sealed artifact and the user's computing device subsequently communicating with a CMS (via an IRM system) to obtain usage permissions for the user corresponding to the sealed artifact, the user may be presented with a use license (from an IRM system) stipulating that the user has been afforded "read-only" access for a period of four hours. However, upon an administrator including a "printing" permission for this user at the CMS, the user may be presented with an updated license that includes the "printing" permission.

In one arrangement, the user may be presented with a message on the user's computing device informing the user that the user's permissions have changed and that the user should send a request for an updated use license. As a further example, upon an administrator "deleting" the sealed artifact at the CMS (e.g., via moving the artifact into a "trash" folder in a workspace of the CMS), all users of the artifact would automatically lose access and use of the artifact (or may lose access at the end of any time period for use specified in the current license).

As will be discussed, the user may be required to install and use an "IRM desktop client" that functions to communicate with a CMS (via an IRM system) to authenticate the user and obtain use licenses for the sealed artifact. The IRM desktop client may function to "intercept" any attempts by a user to open a sealed artifact on a client system or computer and subsequently retrieve use licenses and work in conjunction with the artifact application (e.g., a word processing application or a spreadsheet application) to ensure that the particular usage permissions in the use licenses are being applied and enforced. It should be appreciated that the teachings herein apply to an attempted access of a sealed artifact by a user wherever the attempted access is made from (e.g., within an enterprise network, outside of the enterprise network on a home computer, and the like).

Accordingly, utilities discussed herein can enforce not only access to an "artifact" (i.e., a piece of content of interest to a user or group of users, such as documents, emails, photos, spreadsheets, reports, HTML web pages, and the like) stored within a CMS, but also access to at least substantially all copies of the artifact located anywhere else. Accordingly, organizations can efficiently govern access to various types of artifacts such as requiring execution of a non-disclosure agreement (NDA), revoking or granting various types of access, and the like, while limiting the degree to which system administrators need to manually engage in revoking, granting and/or modifying access to artifacts and/or their copies.

Although this discussion will primarily be applied in the context of sharing artifacts with one or more users according to various policies and permissions in enterprise/cross-enterprise environments, it should be understood that the present discussion can find numerous other applications such as in relation to semi-structured data (e.g., data including tags or other markers to separate semantic elements and hierarchies of records and fields within the data), purchase orders), and the like. In this regard, the following discussion is presented for purposes of illustration and is not intended to limit the discussion to the form or applications disclosed herein. Consequently, variations and modifications consummate with the following teachings, and skill and knowledge of the relevant art, are within the scope of the present discussion.

With continued reference to FIG. 1, system 100 may function to manage access to sealed artifacts (e.g., documents, spreadsheets, image files, and/or other electronic data objects or files) or their copies either within or external to system 100, or, in other words, wherever an attempt to access the artifacts or their copies may occur (e.g. at a home computer after removal from an enterprise network via a flash memory stick, on a workstation at another enterprise, and the like). While the client system 104 is illustrated as being interconnected to the one or more IRM systems 112 and a content management system 108 over a network 118 (e.g., Internet, WAN, LAN) outside of an enterprise firewall 116, this discussion is equally applicable to access or an attempted access to an artifact by a client system 104 disposed within the enterprise firewall 116. Furthermore, although this discussion will primarily be in relation to "the" client system 104 and "the" IRM system 112, it should be understood that this discussion may also relate to additional client systems 104 and IRM systems 112.

Figure 2:
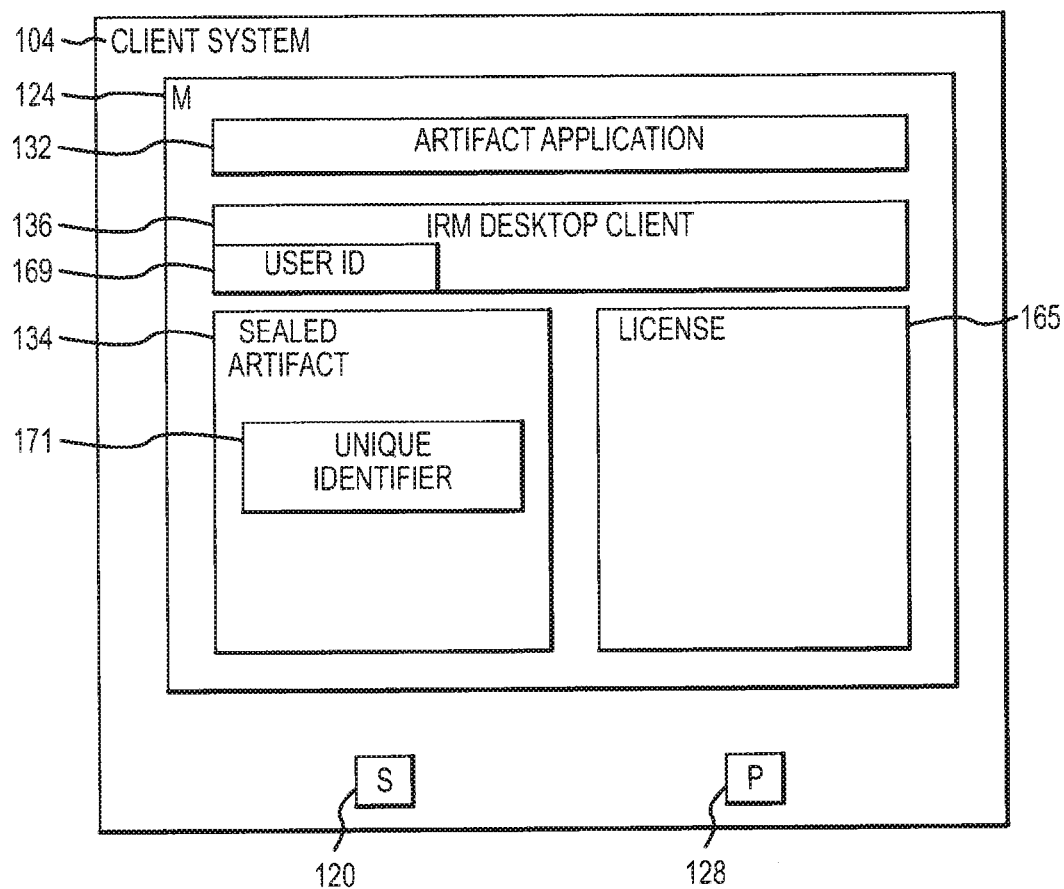
FIG. 2 is a functional block diagram of a client system of the system of FIG. 1.

Turning now to FIGS. 1-2 (FIG. 2 being a more detailed view of the client system 104), the client system 104 may include one or more computer systems (e.g., personal computer, network computer, kiosk, workstation, mobile device) at one or more locations. Furthermore, the client system 104 may include any appropriate input device(s) (e.g. keypad, touch screen, mouse), output devices (e.g., GUI, printer, speakers), interfaces (e.g., USB ports), network connections (wired or wireless), mass storage media, and/or other suitable components for receiving, processing, storing, and communicating data. Additionally, each client system 104 may include one or more storage modules 120, one or more memory modules 124, and one or more processing modules 128. Each storage module 120 may be in the form of any appropriate non-volatile memory such as magnetic media, optical media, removable media, other computer or machine readable medium, and the like, while each memory module 124 may be in the form of any appropriate volatile memory including random access memory (RAM), read only memory (ROM), and the like. Each processing module 128 may include one or more microprocessors, controllers, or any other suitable computing devices or resources and may work, either alone or with other components of system 100, to provide at least some of the functionality of system 100 described herein. For instance, each processing module 128 may be operable to cause the loading of one or more types of data (e.g., sealed artifacts 134) and/or instructions, software, firmware, and hardware (e.g., artifact applications 132, IRM desktop module or client 136, and the like) into memory module 124 from storage module 120, and may process data, code, scripts and other instructions from the memory module 124.

One or more of the artifact applications 132 and the IRM desktop client 136 may collectively function to provide access to a sealed artifact 134 using at least one use license 165. For instance, one artifact application 132 may be a word processing application that allows for the creation, viewing, editing, formatting, printing, and the like of any sort of printable material. Another artifact application 132 may be a portable document format (PDF) writer (e.g., Adobe® Acrobat® X Standard) that allows for the creation, viewing, editing, and the like of PDF files. Numerous other artifact applications 132 operable for the creating, viewing, editing, and the like of artifacts may be utilized with the system 100 (e.g., media players).

With continued reference to FIGS. 1 and 2, the IRM desktop client 136 is broadly operable to communicate with the one or more IRM systems 112 and/or CMSs 108 to obtain a use license (e.g., license 165) for use of the sealed artifact 134 (and/or other sealed artifacts). More specifically, the IRM desktop client 136 may obtain and pass a combination of a user ID 169 of a user of the client system 104 and a unique identifier 171 of the sealed artifact 134 (discussed in more detail below) to the IRM system 112. Thereafter, the IRM system 112 may request and obtain artifact permissions for the particular combination from the CMS 108 and then generate a use license (e.g., license 165) incorporating the artifact permissions and/or any appropriate keys for decryption of sealed artifacts 134. After receiving the use license 165 from the IRM system 112 (and possibly decrypting the use license itself using any appropriate key(s)), the IRM desktop client 136 may then decrypt the sealed artifact 134 and coordinate with the one or more artifact applications 132 to implement the appropriate use/access permissions associated with the combination of the user ID 169 and artifact unique identifier combination 171. Stated otherwise, the IRM desktop client 136 takes over (from the associated artifact application 132) the process of opening a sealed artifact 134 for a user. The IRM desktop client 136 may appropriately communicate and/or share data with the artifact application 132 to ensure that the appropriate use/access level and permissions corresponding to the particular user ID 169 and artifact unique identifier 171 are implemented (e.g., a low-level employee of an enterprise has read only access, but no ability to copy, edit or print the artifact).

For instance, a user may, in order to view, create and/or edit a sealed artifact 134, be required to download or otherwise obtain and install the IRM desktop client 136 and then "point" the IRM desktop client 136 at one or more of the IRM systems 112 that are in communication with the CMS 108. In other words, the IRM desktop client 136 needs to know where the IRM system 112 is so that user rights (e.g., permissions) in relation to a sealed artifact 134 may be appropriately incorporated into the use license 165 by the IRM system 112 and passed to the IRM desktop client 136 to administer access to the sealed artifact 134 by the artifact application 132 according to the particular permissions. The user may link the IRM desktop client 136 to one or more of the IRM systems 112, for instance, either manually (e.g., right clicking on an IRM desktop client 136 icon on a graphical user interface of the client system 104 and selecting the appropriate IRM system 112) or automatically via opening a sealed artifact sent to the user by another user.

In any case, a user of the client system 104 may be required to authenticate with the IRM system 112 via the IRM desktop module 136 before any type of access of or interaction with a sealed artifact 134 or an artifact that is to be sealed can take place. For instance, upon attempting to open (e.g., by double clicking on an icon representing the document) a particular sealed artifact 134 (or a copy thereof) that has been sealed by the IRM system 112, the IRM desktop client 136 may intercept the attempt to open the sealed artifact 134 and then prompt the user to enter the user ID 169 and password combination (or other types of credentials) for subsequent authentication of the user (if the user has not already done so). Upon entry, the IRM desktop client 136 may pass the entered credentials and artifact unique identifier 171 to the IRM system 112 or other appropriate system(s) for authentication or validation. As will be discussed in more detail below, a successful validation of the user may cause the IRM system 112 to request and obtain artifact permissions 166 for the particular user ID 169 and unique identifier 171 from the CMS 108 (e.g., see sealed artifact 134 in FIG. 2c) and then generate and/or cause the generation of a license 165 corresponding to the particular user ID 169 and artifact unique identifier 171 that includes the corresponding artifact permissions 166 and artifact decryption key(s) 167 for transfer back to the IRM desktop client 136 for use of the sealed artifact 134 by the user (see license 165 in FIG. 2a).

Figure 3:
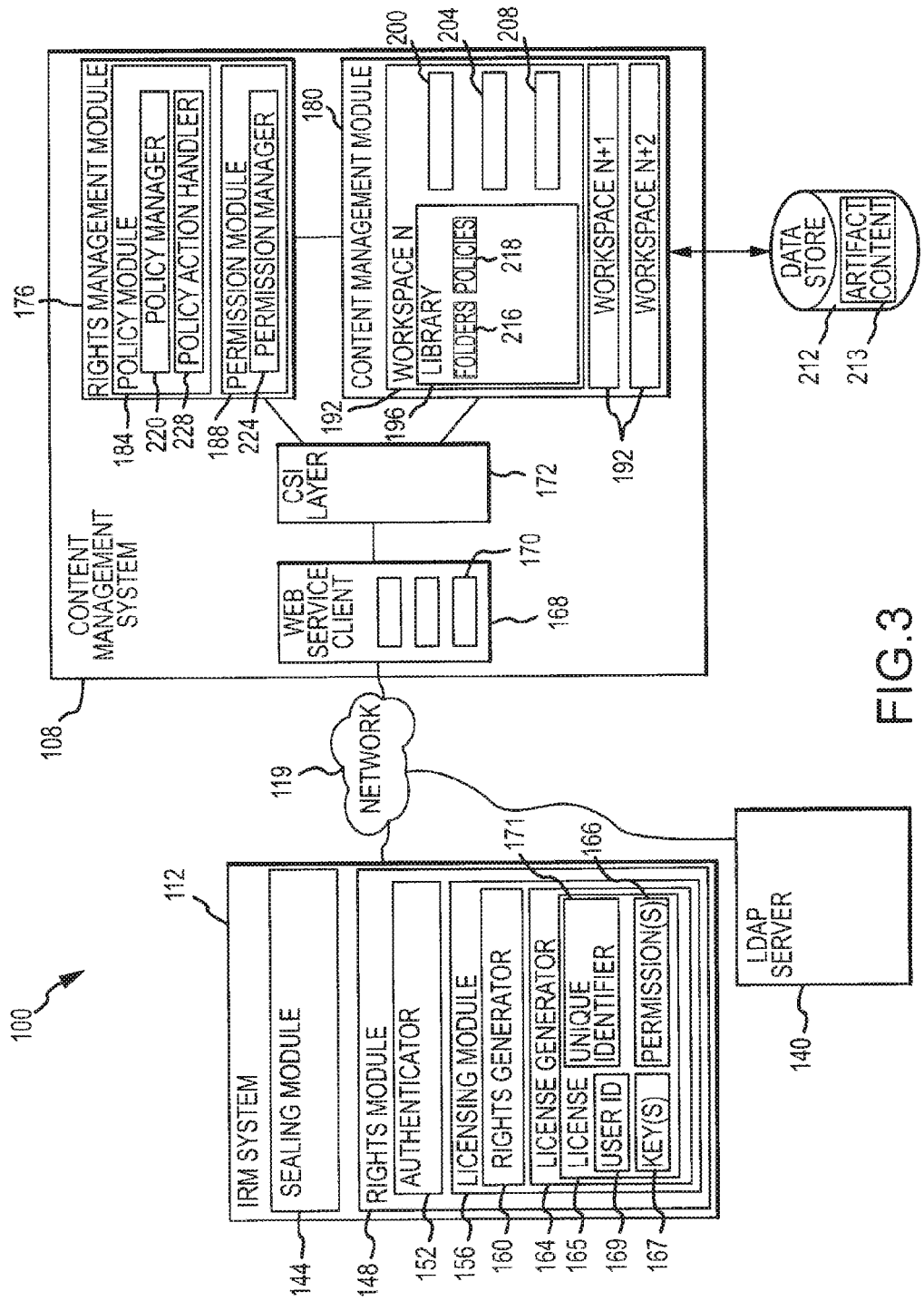
FIG. 3 is a functional block diagram of the system of FIG. 1 showing the IRM system and CMS in greater detail and with the client system removed for clarity.

With reference now to FIG. 3 (FIG. 3 is a more detailed illustration of the IRM system 112 and CMS 108 shown in FIG. 1) and with particular reference to the IRM system 112 and CMS 108 (which may communicate over any appropriate network(s) 119), the IRM system 112 may be responsible for, among other tasks, artifact sealing, user authentication and license generation while the CMS 108 may coordinate and manage artifact sealing, user permissions and the like. Although IRM system 112 and CMS 108 are illustrated and primarily described as being separate, the present discussion may apply both in situations where the functionality associated with the IRM system 112 and CMS 108 is combined on a single "server" and situations where the functionality is divided among any suitable number of servers, according to particular needs. It should be understood that use of the term "server" herein may connote any suitable types of devices, processes, etc. which may include or be associated with any appropriate memory, processor(s), storage and/or input and output devices (e.g., as discussed above in relation to the client system 104).

As illustrated, the IRM system 112 may include a number of modules and/or processes designed to implement the various functionalities discussed herein. For instance, the IRM system 112 may include a sealing module 144 and a rights module 148. The sealing module 144 may be responsible for sealing an artifact in response to a directive from the CMS 108. As part of a sealing request received from CMS 108, the IRM system 112 may receive a unique identifier 171 for the artifact, a last (i.e., most recent) updated time stamp 146, any appropriate CMS rights management ID (e.g., a URI identifying the artifact as belonging to a specific CMS 108 or specific component or aspect of the CMS 108), and/or any desired metadata. Any or all of the aforementioned information may be appropriately included as part of the sealed artifact 134 for subsequent use by the CMS 108 in determining whether or how a user may use/access a sealed artifact 134. After sealing, the sealing module 144 may send or pass the sealed artifact 134 back to the CMS 108 for further processing.

While the sealing module 144 of the IRM system 112 may process requests or directives from the CMS 108 to seal artifacts, the rights module 148 may generally handle or process requests initiated by the client system 104 to access a sealed artifact 134 such as to read/edit/print. For instance, the rights module 148 may include an authenticator 152 and a licensing module 156. In response to receiving a user ID/password combination (and/or other types of credentials) from the IRM desktop client 136 of the client system 104 over the network 118, the authenticator 152 may take appropriate steps to validate that the user who entered to the credentials corresponds to the actual user associated with the userID 169 in the enterprise directory. Part of this authentication process may involve communicating with a lightweight direct access protocol (LDAP) server 140 (e.g., directory system agent (DSA)) or other appropriate server or process that allows access to any appropriate corporate or enterprise directories. While it is not always necessary that the credentials are passed through firewall 116, doing so may advantageously reduce the likelihood of illicit interception of the credentials.

The licensing module 156 may generally function to generate use licenses 165 for end users corresponding to artifact permissions 166 received from CMS 108. For instance, after user authentication by the authenticator 152, a request may be sent to the CMS 108 for artifact use permissions 166 that correspond to a particular combination of a user ID 169 and an artifact unique identifier 171. Thereafter, a rights interpreter 160 of the licensing module 156 may receive artifact permissions 166 for the particular combination and perform any necessary mapping of the received artifact permissions 166 (e.g., accessing a table or database to map an artifact permission 166 of "read" received from CMS 108 into permissions of "open and print"). Once the rights interpreter 160 has determined the artifact permissions 166 corresponding to the particular combination of the user ID 169 and the unique identifier 171, a license generator 164 may function to create or cause the creation of a license 165 that governs use of a sealed artifact 134 according to the received permission/access rights. As shown in FIG. 3, the license 165 may include the user ID 169, unique identifier 171, use permissions 166 and keys 167 for decrypting the sealed artifact 134 (the sealed artifact 134 being shown on client device 104 in FIG. 1). After creation, the license may be passed to the client system 104 over network 118 for subsequent decryption of the sealed artifact 134 by the IRM desktop client 136 and use of the sealed artifact 134 according to the received license 165. While not shown, it should also be appreciated that the license 165 itself may also be encrypted which may be decrypted by the IRM desktop client 134 using any appropriate key(s).

With reference now to FIGS. 1 and 3-5, CMS 108 may include any collection of services, processes and/or devices that are generally responsible for managing work flow in a collaborative environment (e.g., intra-business, business to business, and the like) CMS 108 provides various functions such as aiding in the easy storage and retrieval of data, allowing for a large number of people to contribute to and share such stored data (e.g., emails, documents, movies, pictures, phone numbers, scientific data), reducing repetitive duplicate inputs, and the like. However, unlike traditional CMSs, and as will be discussed in greater detail below, CMS 108 of the present disclosure (i.e., a user with access to various components of the CMS 108 through any appropriate interface) can centrally manage and administer the use and access of various artifacts stored by the CMS 108 by virtue of such artifacts being stored in or by the CMS 108. In this regard, the CMS 108 can function as the "true owner" of sealed artifacts 134 within its domain (i.e., of artifacts that are sealed by IRM system 112 at the directive of CMS 108 and stored within a workspace of CMS 108). As will be appreciated, owners of sealed artifacts 134 (i.e., participants who add artifacts to "workspaces" (discussed below) of the CMS 108) can advantageously control access to their sealed artifacts 134 and any subsequent copies of such sealed artifacts 134, including those saved by users on personal computers or sent as e-mail attachments (in other words, wherever the copies of the sealed artifact 134 reside).

CMS 108 may include a web service client 168 for managing interactions between the CMS 108 and the IRM system 112. For instance, the web service client 168 may be a stateless web service client that is operable to establish a connection with the IRM system 112, perform required operations atomically, and return results to other components and modules of the CMS 108. Furthermore the web service client 168 may include a number of client instances or objects 170, each of which may be mapped to a different IRM system 112 so as to allow the CMS 108 to interact with a given IRM system 112. CMS 108 may also include configuration information for IRM system 112 (e.g., host, port and/or credentials of the IRM system 112) that allows the web service client to initialize the various client objects 170.

Furthermore, CMS 108 may include a rights management module 176 that is in communication with a content management module 180, and a CSI layer 172 that operates as a mediator between the web service client 172 and the rights and content management modules 176, 180 (e.g., by providing client service APIs received from web service client 168). The CSI layer 172 may be responsible for initializing the various objects 170 (using the aforementioned configuration information). Furthermore, the CSI layer 172 may be responsible for mapping data types/formats from and to a native format of the IRM system 112.

The rights management module 176 may have a policy module 184 that is generally operable for evaluating sealing policies and a permission module 188 that is generally operable for evaluating permissions, each of which will be discussed in more detail below. The content management module 180 of CMS 108 may include a number of workspaces 192 (for convenience, subsequent discussion will be in relation to "the" workspace 192) arranged to allow users and teams thereof to collaborate, share information, coordinate activities, and the like, whether internal or external to one or more enterprises or organizations. For instance, the workspace 192 may include a number of components such as an artifact library 196, a team wild 200 (e.g., a website that allows the creation and editing of any number of interlinked web pages via a web browser), team announcements 204, and/or a number of other components 208. The content management module 180 may be in appropriate communication with one or more data stores 212 for storage of the various types of data manipulated by the workspace 192 (e.g. artifact content 213). As with the other modules, functionalities, etc. disclosed herein, the workspace 192 may be implemented by way of any appropriate logic, protocols or computer-readable instructions stored on any appropriate computer-readable medium and executed by any appropriate processor(s) or controller(s). Furthermore, the workspace 192 may be accessible and viewable via any appropriate user interface device(s) (e.g., including a GUI, keyboard, etc.) in appropriate communication with the CMS 108.

The artifact library 196 of the workspace 192 may generally include a number of components that allow users and team members to add and edit shared files/artifacts and folders, move artifacts between folders, perform artifact access control and version management, and the like. In one embodiment, the library 196 may include a number of folders 216 that allow members of the workspace 192 to store, share and manipulate artifacts. For instance, folders could be created according to artifact type, client number and/or user name. Workspace members may upload/create/transfer artifacts into one or more of the folders 216.

The library 196 may also include a policies component 218 that represents the various sealing policies associated with the workspace 192. Administrators and other appropriate users may access any appropriate processing module via any appropriate user interface that allows for the creation, editing and/or deletion of one or more sealing policies. As discussed previously, each policy may be in the form of an "if/then" type rule whereby if the policy manager 220 determines that a particular circumstance or set of circumstances has occurred, then the policy manager 220 causes sealing of one or more artifacts in the workspace 192. In this regard, the system 100 allows administrators the flexibility to customize almost any desired policies for the automatic sealing of artifacts. The library 196 may include numerous other components such as security settings and the like.

Numerous types of policies governing sealing of artifacts are envisioned, and the examples herein are merely provided to assist readers in understanding the various functionalities of the system 100. In one embodiment, a policy may be created (e.g., by a system administrator accessing the policy manager 220 through any appropriate user interface) stipulating that any artifact disposed (e.g., created, moved, copied) in/into a particular folder 216 in the workspace 192 is to be automatically sealed (i.e., by the IRM system 112). For instance, any artifact moved into a personal folder 216 (e.g., "Joe Smith Sealed Artifacts") of an enterprise user in the workspace 192 would be automatically sealed (i.e., the artifact would be sent to the IRM system 112 for sealing, and then the sealed artifact 134 would be returned to the personal folder 216 and replace the original, unsealed artifact). In one arrangement, log messages indicative of an artifact being moved into the personal folder may be generated by one or more components and/or modules of the CMS 108 and thereafter sent to and processed by the policy manager 220 to determine that the "if" event of this policy has occurred.

In another embodiment, a policy may be created stipulating that any artifact including one or more particular letters, words or phrases in the artifact file name would be automatically sealed upon disposition of the artifact into a workspace folder. For instance, a policy may stipulate that any artifact including the word "patent" as part of the artifact's file name that is uploaded into any folder of the workspace (i.e., regardless of which folder) would be automatically sealed. Various combinations of the above embodiments are also envisioned. For instance, a policy may be created by an administrator using the policy manager 220 stipulating "Seal all PDF documents uploaded into /Org/Finance that contain 'taxinfo'". Such a policy could be appropriately translated (by any appropriate system modules) into the policy condition "where event.doc_name like 'taxinfo %' and event.doc_type'.doc'". Stated otherwise, a policy could stipulate sealing of only (a) particular artifact(s) uploaded and/or moved into (a) particular folder(s).

Figure 4:
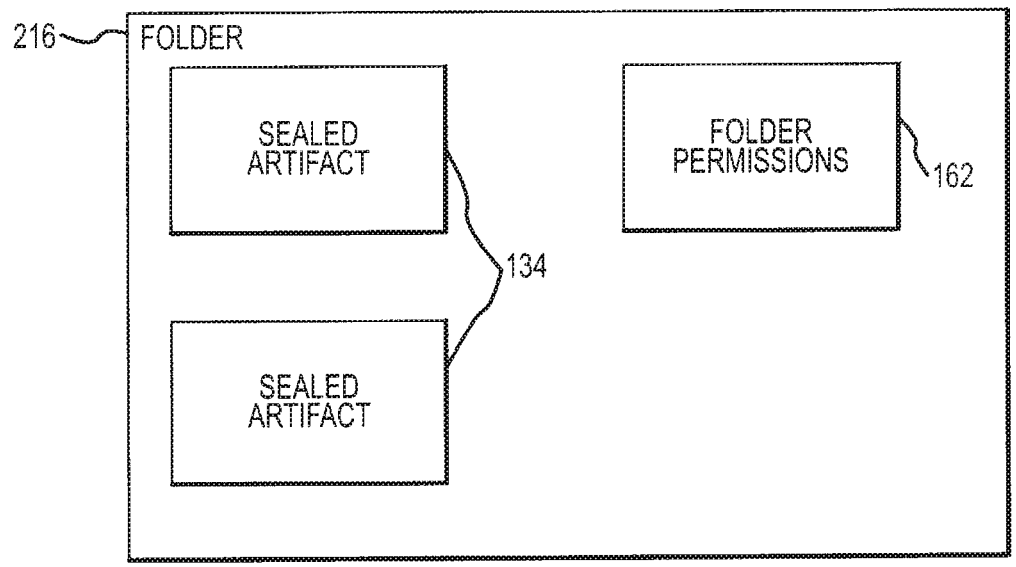
FIG. 4 is a functional block diagram of a folder of a workspace of the CMS of FIG. 1, the folder including a number of sealed artifacts and folder permissions.

With reference to the schematic functional diagram of FIG. 4, a folder 216 may include a number of sealed artifacts 134 along with folder permissions 162 for the particular folder 216. The folder permissions 163 may include a number of user IDs (not shown) representing users that have access to the particular folder 216 (i.e., such users can move artifacts into the folder 216, but do not necessarily have access to sealed artifacts 134 already in the folder 216). For instance, a permission may be set stipulating that only "Joe Smith" (as validated by the IRM system 112 via supplied credentials, although not necessarily supplied via the IRM desktop client 136) may have access to the "Joe Smith Sealed Artifacts" folder. In this regard, attempts by other users to seal an artifact by creating or moving an artifact in or into the "Joe Smith Sealed Artifacts" folder would fail (and appropriate error messages may be generated). Similar permissions could be created in relation to groups or teams (e.g., a folder 216 in a particular workspace 192 accessible to all members of a team)

Figure 5:
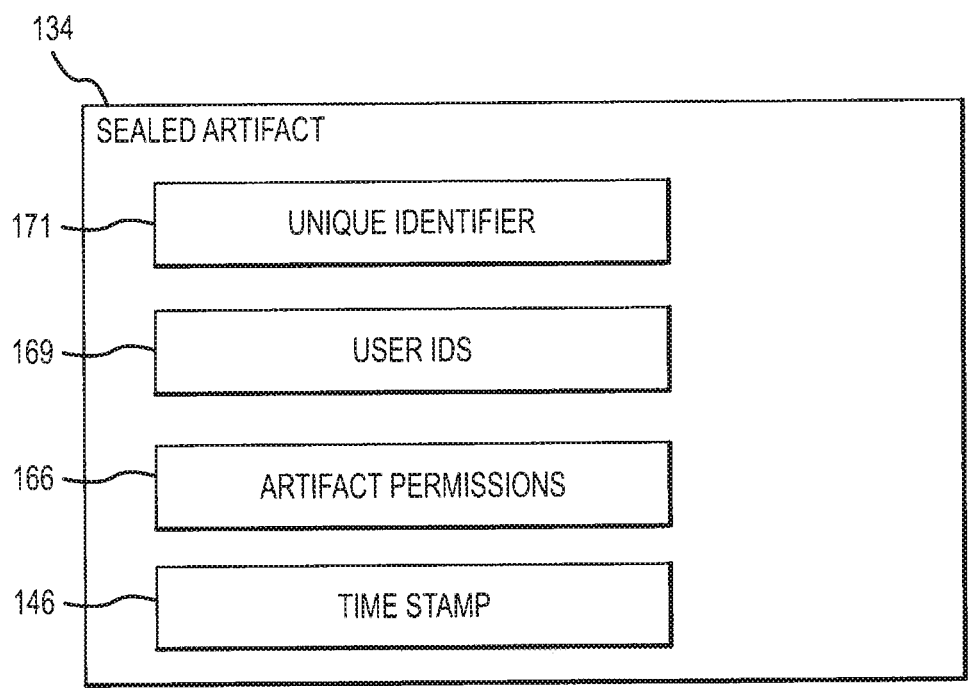
FIG. 5 is a functional block diagram of one of the sealed artifacts of FIG. 4.

As shown in FIG. 5, each sealed artifact 134 may include or be associated with a number of objects such as unique identifier 171 (that identifies this sealed artifact 134 from another sealed artifact 134), one or more user IDs 169, one or more artifact permissions 166 for the various user IDs 169, and a most recent/last updated time stamp 146 for the sealed artifact 134. It should also be appreciated that at least some of these objects (e.g., unique identifier 171, time stamp 146) may be associated with an artifact before it is sealed/resealed (as discussed earlier, the CMS 108 passes the unique identifier 171 and time stamp 146 to the IRM system 112 as part of a sealing/resealing request of an artifact/sealed artifact). It is also contemplated that some of the user IDs 169 may not be associated with any artifact permissions 166.

In any event, and in one arrangement, the folder and artifact permissions 162, 166 may be created/edited (e.g., by an artifact owner or administrator) by way of appropriately accessing and manipulating the folder and/or sealed artifact 216, 134 in the workspace 192 (e.g., right clicking, selecting a drop down menu, and the like) to bring up (e.g., on a user interface) a "permissions" menu (not shown). Such permission menus may allow various permissions corresponding to sealed artifacts 134 and folders 216 to be created and/or edited Numerous types of artifact permissions 166 are envisioned which may be granted either alone or in any appropriate combinations such as read-only, edit, print, copy, move (e.g., to another folder 216 in the workspace 192), delete, reseal, unseal, screen grab, save as, search, and the like. Moreover, one or more conditions that must be satisfied before the artifact can be accessed according to the permissions may be set such as requiring signature of an NDA document (e.g., an electronic NDA), requiring use of the most recent version of the artifact (e.g., as determined by comparing a time stamp associated with a local copy of the sealed artifact on the client system 104 with the primary copy of the sealed artifact in a workspace folder), and the like. Also, various conditions may be associated with the actual use of the artifact by the user (e.g., the artifact may be opened for a period of 4 hours, at the end of the period, the user would be required to contact the CMS 108 for further access).

While the artifact permissions 166 have been illustrated and described heretofore as setting forth those types of use/access that particular users (as identified by their user IDs 169) have to sealed artifacts 134, the present disclosure is by no means limited to such an interpretation. In some embodiments, the various artifact permissions 174 can be associated with one or more specific folders 216, groups or teams individually or in any appropriate combinations. For example, a "read-only" artifact permission 166 could be associated with sealed artifacts 134 disposed within a particular folder 216 in the workspace 192, regardless of the type or name of sealed artifact 134 within the folder 216 (e.g., by accessing folder permissions 162 shown in FIG. 2b). In this example, any user or group with access to the particular folder 216 may have read-only access to any sealed artifact 134 within the particular folder 216. As another example, a "read/edit/copy" permission could be associated with an "Enterprise Developer/Architect" group for artifacts in a "Enterprise Confidential Artifacts" folder. In this regard, any user within the "Enterprise Developer/Architect" group (which may be determined by accessing LDAP server 140) may have read/edit/copy access to sealed artifacts 134 within the "Enterprise Confidential Artifacts" folder. Thus, permissions for users and groups can be set or modified in numerous manners such as by moving an artifact from one folder to another folder in the workspace 192, associating a user with a particular user group, manually changing permission settings for an individual user or group, and the like. As discussed previously, one or more conditions or prerequisites for use/access of a sealed document may also be set in a manner similar to the permissions themselves. Moreover, various permissions may be created/modified/deleted numerous times throughout the lifecycle of an artifact.

In addition to the (initial) sealing of artifacts and setting of artifact permissions 166, the teachings disclosed herein may also be applied to the "resealing" of artifacts upon the editing of a sealed artifact 134. For instance, upon a user having appropriate credentials and permissions logging into the IRM desktop client 136 and thereafter gaining access to a sealed artifact 134 to which the user has "editing" and "resealing" permissions, the user may perform any desired edits to the sealed artifact 134 on the user's client system 104. Once finished, the desktop client 136 may upload the edited version of the sealed artifact 134 to the CMS 108 whereby the CMS 108 causes the "resealing" of the sealed artifact 134 in a manner similar to the "sealing" operations disclosed herein.

In any event, and upon the policy manager 220 determining that a policy has been satisfied, any appropriate modules/processes/layers associated with the CMS 108 may perform a number of actions before a sealing command is passed to the IRM system 112. In addition to retrieving the content making up the artifact, various types of information or metadata of the artifact may also be retrieved and/or generated such as the unique identifier (UID) 171 of the artifact, last updated time stamp 146 of the artifact, any appropriate classification ID for the rights management module 176 or the CMS 108 as a whole (e.g., a URI identifying that the artifact belongs to the specific CMS 108), and/or any additional desired metadata for inclusion as part of the sealed artifact 134. Any or all of such information/metadata may then be passed along with the artifact content itself to the IRM system 112 for subsequent sealing of the artifact.

To assist the reader in understanding the various features and functionalities of the system 100, a number of protocols/flow charts/logic diagrams will now be presented and discussed both individually and in combination. It should be understood that numerous variations to the following protocols may be made while remaining within the spirit of the present disclosure. Turning to FIG. 3, a method or protocol 300 (e.g., which may be embodied in computer-readable instructions) is shown illustrating a sequence of steps that may be performed to cause both the sealing of an artifact and the setting of one or more permissions that govern use of the artifact. At 304, an artifact (e.g., PDF, JPEG, word document) is disposed in a folder 216 (e.g., created, moved into) of a first workspace 192 of CMS 108 (e.g., see FIG. 2), and then it is queried whether a sealing policy of the folder 216 has been satisfied at 308 (i.e., whether a particular policy exists in the CMS 108 stipulating that upon disposing an artifact in the particular folder, the artifact is to be automatically sealed). This step 308 may involve the policy manager 220 or any other components of CMS 108 accessing any policies 218 associated with the folder 216. As discussed previously, any appropriate manners of monitoring for the satisfaction or matching of a policy 218 may be utilized (e.g., receiving and processing log messages generated by components of CMS 108).

Upon an affirmative answer at 308, the artifact and any appropriate artifact parameters (e.g., most recent time stamp 146, unique identifier 171, CMS URI, target directory and/or workspace folder where sealed artifact is to be stored, a flag indicating whether the original artifact is to be deleted after sealing) may be forwarded to the IRM system 112 for sealing of the artifact at 312. For instance, detection of the satisfaction of a policy may cause a policy action handler 228 of the rights management module 176 to invoke the CSI layer 172 which subsequently retrieves and loads an object 170 of the web service client 168 corresponding to a particular IRM system 112 that is to perform sealing of the artifact. Additionally, the CSI layer 172 may retrieve and load the artifact content from the data store 212 in addition to any appropriate artifact information that has been generated, and performs any necessary transformation of the content and data into a format usable by the IRM system 112. After an appropriate web service API has been invoked, the object 170 may be utilized to pass the artifact content and data to the IRM system 112 for sealing of the artifact.

If a sealing policy of the folder has not been satisfied at 308, it may be queried whether any other sealing policies have been satisfied (e.g., whether the artifact file name matches a particular sealing policy) at 316. Any appropriate message may be returned (e.g., error message) to the user who has attempted to seal an artifact upon no policies being satisfied at 318. Otherwise, the process may flow to 312 whereby steps may be performed as discussed above if another sealing policy has been satisfied.

Turning to 320, the sealed artifact 134 (e.g., encrypted and embedded with any appropriate information/metadata such as an artifact unique identifier 171, a most recently updated time stamp 146, a URI identifying the artifact as belonging to a specific CMS 108 or specific component or aspect of the CMS 108) may be received at web service client 168 via the appropriate object 170 and eventually passed via CSI layer 172 into the appropriate folder of the workspace 192 as specified in the metadata embedded in the sealed artifact. For instance, policy action handler 228 may rename the file extension of the sealed document to indicate that the artifact is now sealed (e.g., by adding an "s" at the beginning of the file extension, such as by changing a file name from "patent.doc" to "patent.sdoc"). The policy action handler 228 may also see that the original artifact is deleted or at least removed from the target folder in the workspace 192 and that the sealed artifact 134 is stored in the target folder (i.e., a representation of the sealed document may be provided in the target folder while the content of the sealed artifact may be stored in data store 212). As discussed previously, in the event that an artifact is being "resealed" upon a previously sealed artifact 134 being edited by a user with appropriate permissions, then it would be the previously sealed artifact 134 that would be deleted instead of the original (unsealed) artifact. Upon one or more of the above steps failing, the sealing process may fail and any appropriate error message may be returned to the sealing requester.

At 324, various artifact permissions 166 in relation to use/access of the sealed artifact 134 (and/or conditions for use of the sealed artifact 134 according to such artifact permissions 166) may be set for the sealed artifact 134 as discussed previously (e.g., read-only, editing and/or printing according to the specific sealed artifact 134, folders 216, users and/or groups). Different users can have different artifact permissions 166. If it is determined that no additional artifact permissions 166 need to be set at 328, then the protocol ends at 332. However, if it is determined that artifact permissions 166 for another artifact need to be set at 328, then the protocol 300 may query at 336 whether the other artifact is already sealed. If the other artifact is already sealed, then the permissions for the other sealed artifact 134 may be set at 324. If the other artifact is not already sealed, then the protocol 300 may flow back to 304 whereby the other artifact may be disposed into a folder 216 of a workspace 192 whereby it may be queried at 308 and 316 whether any policies have been satisfied.

Figure 7:
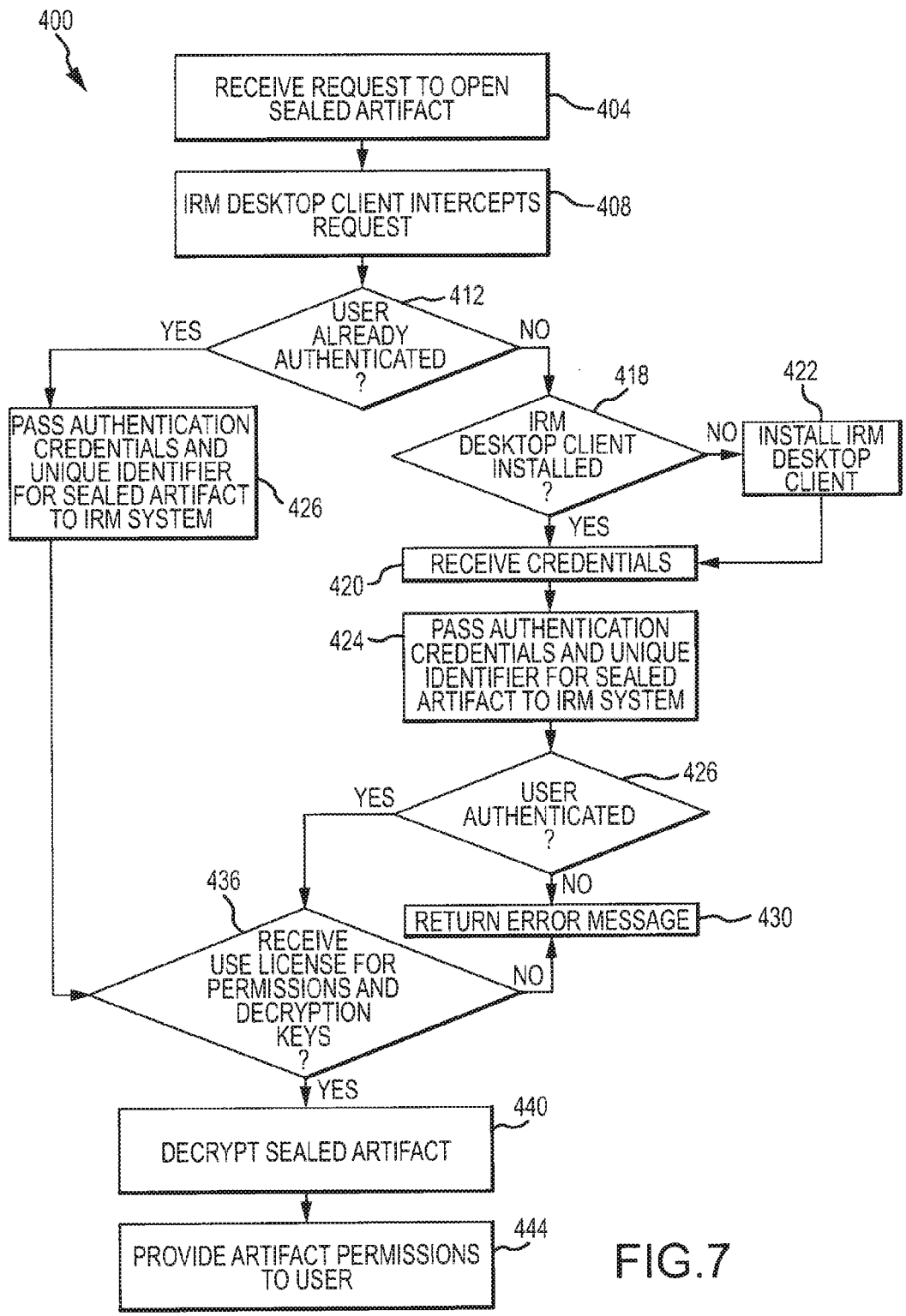
FIG. 7 is a protocol illustrating processing steps that may be performed at a client system for opening a sealed artifact.
Figure 8:
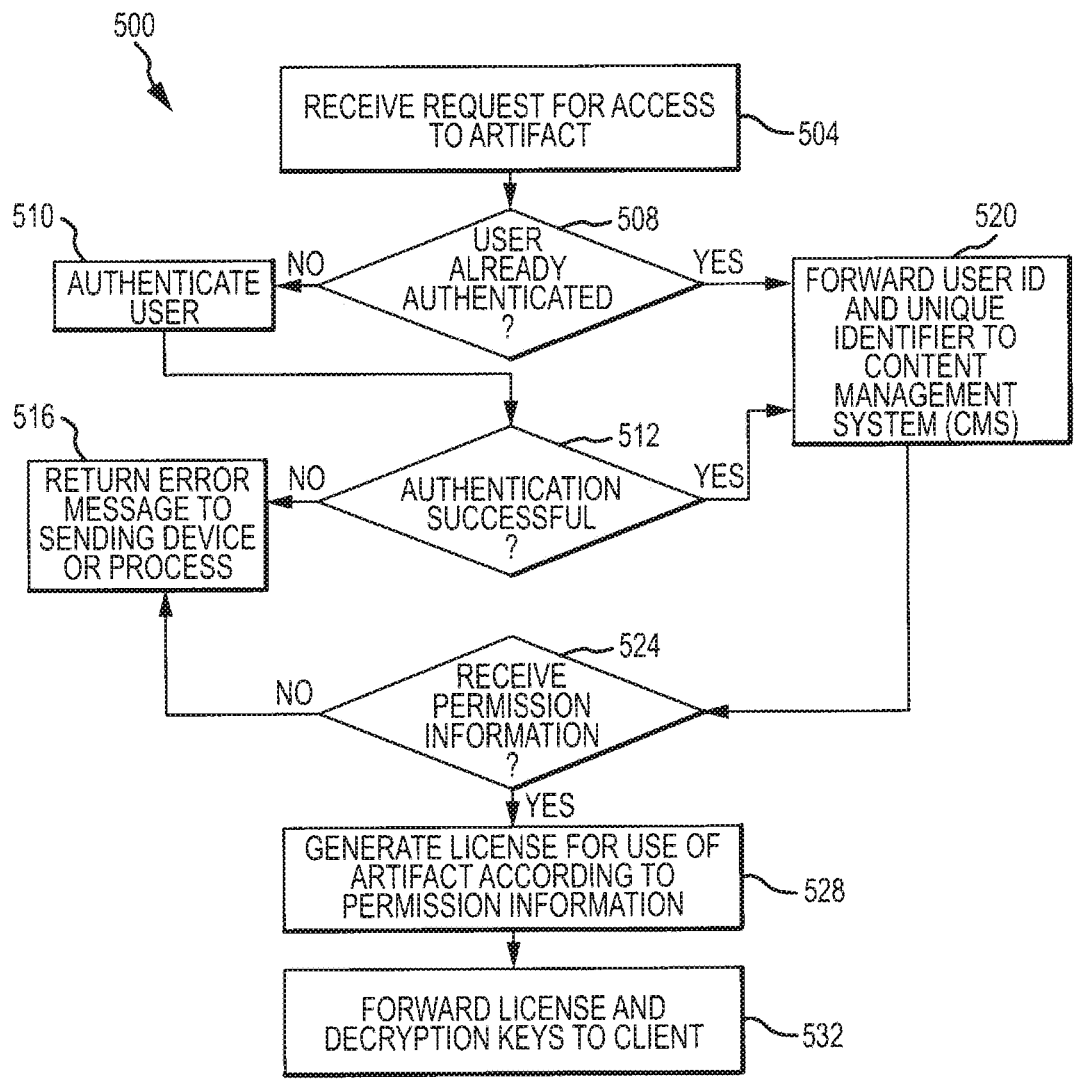
FIG. 8 is a protocol illustrating processing steps that may be performed at an IRM server for validating users of sealed artifacts and generating licenses for use of such sealed artifacts.
Figure 9:
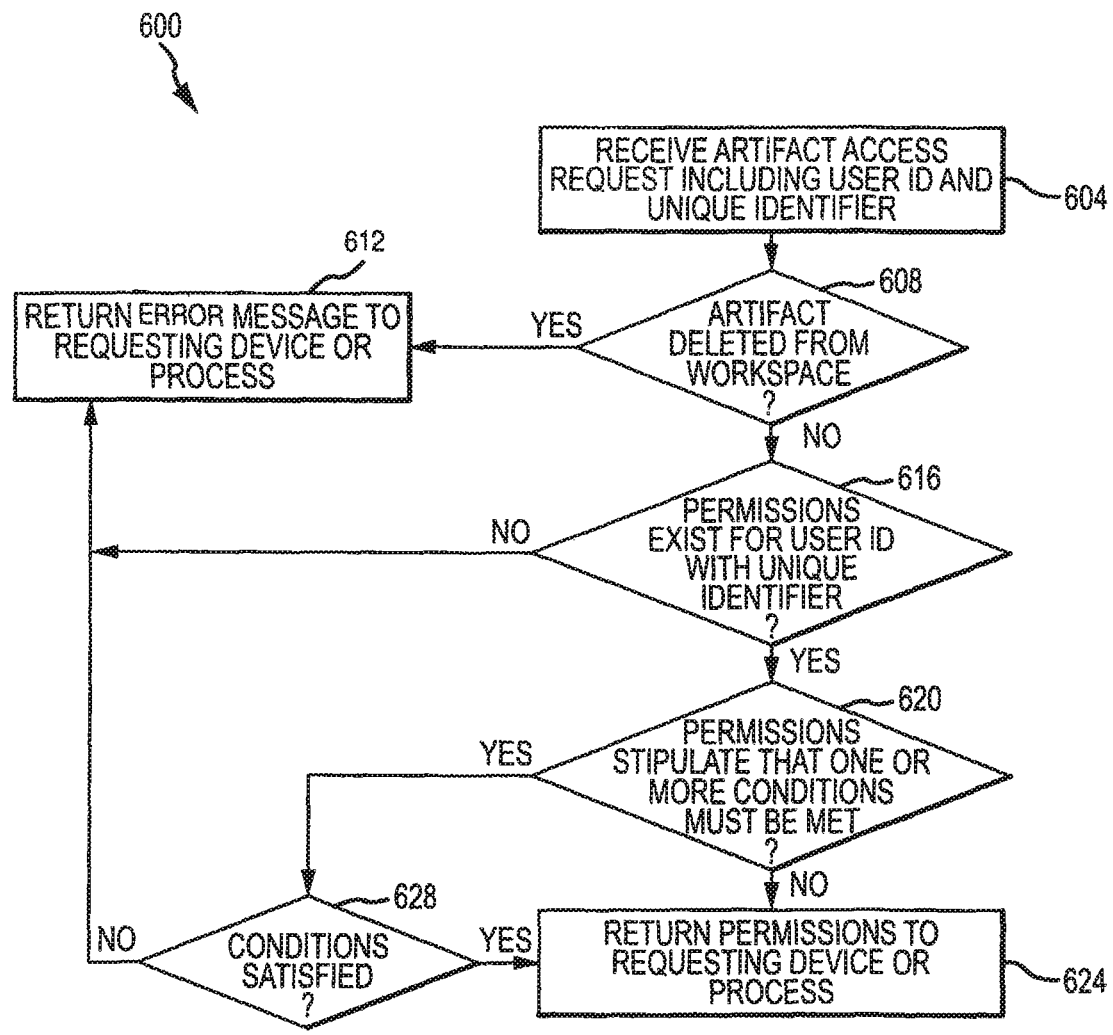
FIG. 9 is a protocol illustrating processing steps that may be performed at a CMS for determining whether a user has access to an artifact and, if so, the type of access afforded to the user.

With reference now to FIGS. 7-9, protocols 400, 500, 600 are generally collectively directed to a process of an end user at a client system 104 attempting to access/use a sealed artifact 134 that has been sealed according to the processes and teachings disclosed herein, and various processing steps that may be performed at the client system 104, IRM system 112, and CMS 108 to determine whether the user may access the sealed artifact 134 (and, if so, the type of access of the sealed artifact 134 that the user has been afforded). Protocol 400 is generally directed to processes performed on/at/by the client system 104, protocol 500 is generally directed to processes performed on/at/by the IRM system 112, and protocol 600 is generally directed to processes performed on/at/by the CMS 108.

At 404 in FIG. 4, a request is received at a client system 104 to open or otherwise manipulate a sealed artifact 134 (e.g., by double clicking on an icon representing the sealed artifact on a GUI of the client system 104). For instance, the user may have received the sealed artifact 134 via email whereby the user may have saved the sealed artifact 134 on storage 120 of the client system 104. As another example, the user may have transferred a copy of the sealed artifact 134 onto the client system 104 from a removable storage device (e.g., memory stick, SD card). As discussed above, the sealed artifact 134 may include embedded metadata such as unique identifier (UID) of the artifact and/or any additional desired metadata.

In any event, and instead of the artifact application 124 providing access to the sealed artifact 134, the IRM desktop client 136 intercepts the request to open the sealed artifact 134 at 408. For instance, the IRM desktop client 136 may be registered as the "open with" application on the client system 104 for one or more supported artifact formats (e.g., .doc, .pdf, .jpg, .mpg, .wmv, and the like). In this regard, the IRM desktop client 136 may be automatically invoked upon a user attempting to open a sealed artifact 134 (e.g., by double clicking on an icon representing the sealed artifact 134).

If the IRM desktop client 136 determines at 412 that the user has already been authenticated, the IRM desktop client 136 passes the authentication credentials (e.g., user ID 169) and any appropriate data corresponding to the sealed artifact 134 (e.g., unique identifier 171, last update time stamp 146, etc.) to the rights module 148 of the IRM system 112 over network 118 at 416. If the user is not already authenticated with the IRM desktop client 136 but it is determined at 418 that the IRM desktop client 136 is already installed on the client system 104, then the IRM desktop client 136 may receive the user's credentials at 420 and pass the credentials and the artifact unique identifier 171 to the IRM system 112 at 424. If the IRM desktop client 136 is not already installed on the client system 104, then the user may appropriately locate and install the IRM desktop client 136 on the client system 104 at 422 and enter credentials at 420, and then the IRM desktop client 136 may passes the credentials and the artifact information (e.g., unique identifier 171, time stamp 146 of last update) to the IRM system 112 at 424.

Turning to protocol 500 in FIG. 5, the rights module 148 of the IRM system 112 receives the request to open the sealed artifact 134 at 504, the request including credentials (e.g., user ID and password) and the artifact unique identifier 171 as discussed at 416 and 424 in FIG. 4. If the user was determined to already be authenticated at 412 in FIG. 4, then the rights module 148 of the IRM system 112 acknowledges such authentication at 508 in FIG. 5 and then may forward the user ID 169 and unique identifier 171 of the sealed artifact 134 to the CMS 108 at 520 for access rights determination. If the user was not determined to already be authenticated at 412 in FIG. 4, then the rights module 148 acknowledges the lack of authentication at 508 in FIG. 5, and the authenticator 152 of the rights module 148 attempts to authenticate the user at 510 in FIG. 5.

If the user is determined to not be authenticated at 512 in FIG. 5, then an error message may be returned to the client system 104 at 516. Correspondingly, upon the client system 104 receiving the error message and thereby determining that the user was not authenticated at 426 in FIG. 4, the IRM desktop client 136 may return or display any appropriate message to the user indicating the authentication failure at 430. If the user is determined to be authenticated at 512 in FIG. 5, then the protocol 500 may flow to 520 whereby the user ID 169 and unique identifier 171 are forwarded to the CMS 108.

Figure 6:
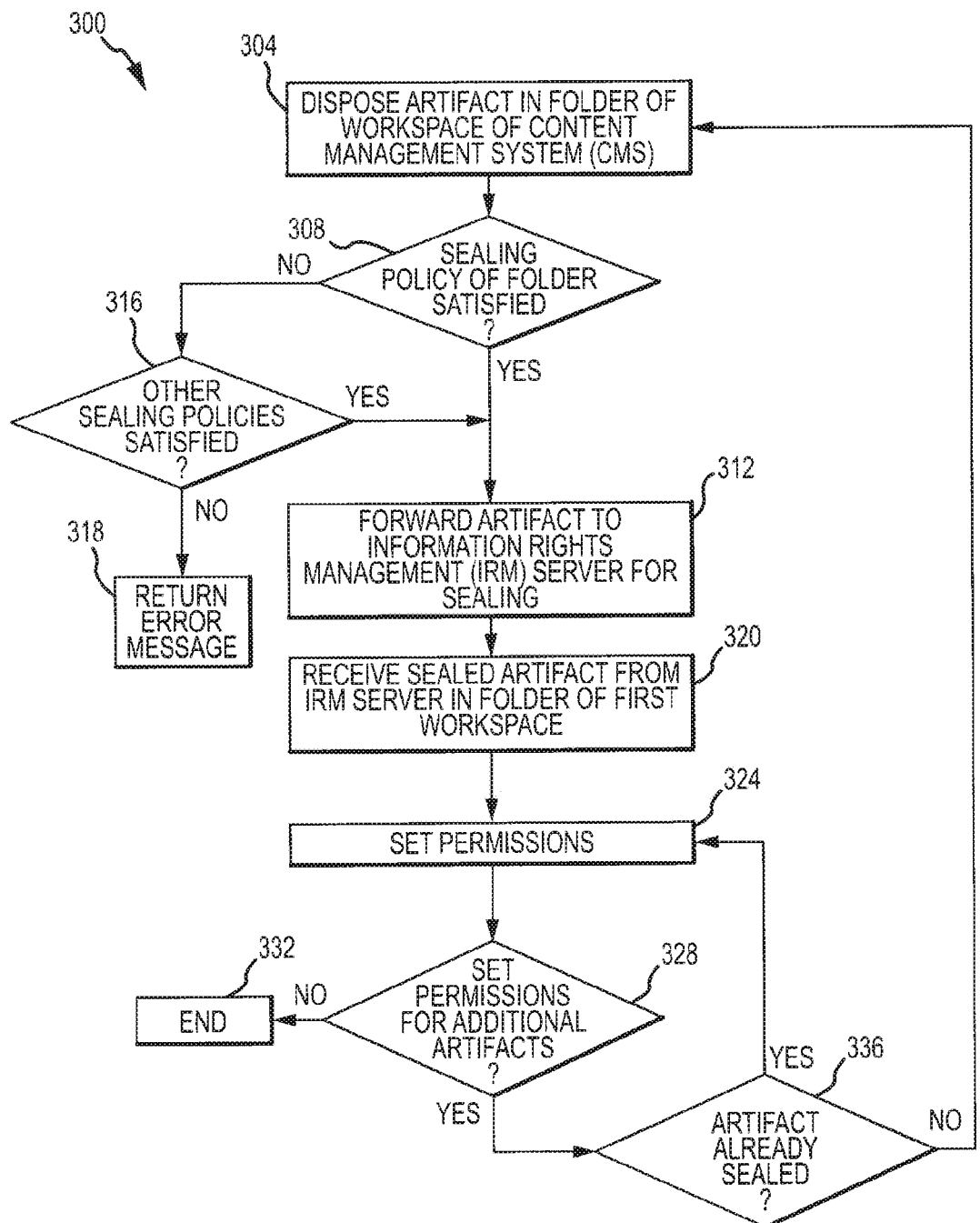
FIG. 6 is a protocol illustrating processing steps that may be performed at a CMS for sealing an artifact and setting permissions for use of the sealed artifact.

Turning to protocol 600 in FIG. 6, an artifact access request is received at the CMS 108 from the IRM system 112 over network 119 (e.g., via web services or other communication path), the request including at least the user ID 169 and the artifact unique identifier 171. For instance, the request may be received by web service client 168 and then passed by CSI layer 172 to the permission manager 224 of the rights management module 176 whereby a number of determinations may be made in relation to use of the sealed artifact 134 by the user associated with the user ID 169.

For instance, the permission manager 224 may determine at 608 whether the sealed artifact 134 has been deleted from the workspace 192. Any users with "delete" permissions in relation to the sealed artifact 134 may delete a particular sealed artifact 134 in the workspace 192 by, for instance, moving the sealed artifact 134 into the "workspace trash". Accordingly, a "file deleted" status may be associated with the unique identifier 171 for the sealed artifact 134 which thereby limits or prevents any subsequent accesses of the sealed artifact 134 in addition to any copies of the sealed artifact 134 regardless of where such copies exist (e.g., within the enterprise, outside of the enterprise on a personal computer). The permission manager 224 may have access to any appropriate database (e.g., data store 212) that associates the various artifact unique identifiers 171 with location information (where the artifact content is being stored), permission information, status information (e.g., deleted or not deleted).

Upon the permission manager 224 determining that the requested sealed artifact 134 has been deleted from the workspace at 608 in FIG. 6, an error message may be returned at 612 either to the IRM system 112 for passing to the IRM desktop client 136 or directly to the IRM desktop client 136 (either of which may be over any appropriate network(s) or via any other appropriate communication path(s)). In the event that the IRM system 112 determines at 524 in FIG. 5 that permission information was not received (e.g., because it received an error message indicating that the sealed artifact has been deleted), the IRM system 112 may pass the error message to the client system 104. In FIG. 4, and upon the IRM desktop client 136 determining at 436 that a use license 165 and/or decryption keys 167 have not been received from the IRM system 112 (e.g., because an error message was received instead), the IRM desktop client 136 may display any appropriate message indicating such denial of access at 430.

Returning to FIG. 6, if the permission manager 224 determines at 608 that the sealed artifact 134 has not been deleted from the workspace, then the permission manager 224 may determine at 616 whether artifact permissions 166 exist for the particular user ID 169 and unique identifier 171 combination. For instance, the permission manager 224 may appropriately access one or more databases in the data store 212 which contain permission information for users of the workspace 192. In one arrangement, each user ID 169 of the workspace may be appropriately associated with various artifact unique identifiers 171 along with permissions (e.g., read-only, edit, print, etc.) for each of the unique identifiers 171. Additionally or alternatively, various forms of permission mapping may be utilized. In this situation, both the CMS 108 and IRM system 112 may have corresponding permission mapping tables which may be referred to as necessary. As one example, a user ID 169/artifact unique identifier 171 combination could be associated with a CMS access right which can be mapped to one or more permissions at the IRM system 112, as shown below:

| CMS Access Right | IRM System Permission(s) |
|---|---|
| Read | Open, Print |
| Write | Edit, Reseal, Copy, Unseal, Screen Grab, Save As (i.e., full access to the sealed artifact) |
| Discover | Search |
| Execute | Unseal |

As another example, each user ID 169 may be associated with one or more particular "roles" or "types", where each role or type may carry zero or one or more access/use rights, as shown below:

| User Role/Type | Permission(s) |
|---|---|
| Workspace Member | Open, Edit |
| Workspace Viewer | Open |
| Read-only | Open |
| Read-Write | Open, Edit |
| Enterprise Developer | Read |
| External Contractor | Read |
| External User Not Related to Contract Project | None |
| External User Related to Contract Project | Read |
| Enterprise Developer Architect | Open, Edit |

In the event of two or more conflicting permissions (e.g., a folder-level permission provides "editing" access of all artifacts within the folder while an artifact-level permission provides merely "read-only" access of the artifact), more specific permissions take precedence over more general permissions. For instance, artifact-level permissions would take precedence over folder-level permissions, and folder-level permissions would take precedence over workspace-level permissions.

In any case, and if the permission manager 224 determines that the user ID 169 either is no longer associated with the workspace 192 and/or a folder 216 in the workspace 192 or does not have any artifact permissions 166 for the particular artifact unique identifier 171 (e.g., the user ID 169 is labeled as or associated with an "External User Not Related to Contract Project" role), an error message may be returned at 612. However, if the permission manager 224 determines that the one or more artifact permissions 166 do exist for the particular user ID 169 at 620, the permission manager may also determine whether the artifact permissions 166 stipulate that one or more conditions must be satisfied at 620, and, if so, whether such conditions have been satisfied at 628.

As discussed previously, numerous conditions are envisioned such as requiring use of the most recent version (e.g., where such determination would be made be comparing the most recent update time stamp sent by the IRM desktop client 136 in the request with the most recent update time stamp with the version of the sealed artifact present in the CMS 108), requiring signature of a (e.g., electronic) NDA, and the like. If one or more required conditions have not been satisfied, then the access request is rejected and an error message is returned to the IRM desktop client 136 (e.g., via the IRM system 112).

In relation to the error messages returned by the CMS 108 at 612 in FIG. 6, the following types of error messages are envisioned:

| Title/Subject | Message Body |
| --- | --- |
| File Deleted | "The master copy of this document has been deleted from Beehive and as such you can no longer access this copy." |
| Newer Version | "A newer version or updated copy of the artifact is available. Please click on attached link to download the newer version or updated copy. Your version of the artifact is no longer available." |
| Insufficient Permissions | "Your read permissions have been revoked and the privileges defined on the master copy of the artifact prevent you from opening your version of the artifact. Please click on the attached link to contact the workspace coordinator for more information." |
| File Locked/Checked-Out | "The sealed artifact has been checked out by another user. Please try again later." |

With continued reference to FIG. 6, and if the conditions have been satisfied in 628 or if it is determined in 620 that there are no conditions associated with the user's access of the sealed artifact 134, then the artifact permissions 166 (e.g., along with the user ID 169, last update time stamp 146, unique identifier 171, etc.) may be passed back to the IRM system 112 at 624. As discussed previously, permission mapping may be utilized whereby, for instance, a particular CMS access right or user role/type may be returned to the IRM system 112 which may be mapped into one or more artifact permissions 166 via use of any appropriate mapping mechanism or process (e.g., referring to a database). Moreover, the CMS 108 may communicate with the IRM system 112 by way of the CSI layer 172 invoking the appropriate web service client object/instance 170.

Turning to FIG. 5, and upon the IRM system 112 receiving the artifact information (e.g., unique identifier 171, artifact permissions 166, conditions of use, user ID 169, etc.) at 524, the rights interpreter 160 of the licensing module 156 maps the received permission information into one or more use/access rights, and then the license generator 164 generates (or causes the generation of, e.g., by another module or component) a license 165 according to the user's artifact permissions 166 and/or permission conditions. For instance, a license 165 may be generated in any appropriate manner that provides the user with "read-only" access of the sealed artifact 134, but stipulates that the user would be required to obtain any updated versions of the artifact and correspondingly lose access to the current version upon the updated version being "resealed" in the workspace. In one arrangement, the permission manager 220 or other module or process of the CMS 108 could pass a "Newer Version" error message to the client system 104 with a link to the newer version of the sealed artifact 134, and also close the artifact application 124 or otherwise prevent or limit use of the current version. Another license may be generated that provides the user with editing access for any appropriate period of time (e.g., 4 hours) measured from the time of license generation or from time of first access of the artifact. Numerous other licenses 165 for use of sealed artifacts 134 are envisioned.

Upon generation of the license, the IRM system 112 passes or forwards the license 165 and decryption keys 167 (which, as shown, may be contained within the license 165) for the sealed artifact 134 (and/or additional or other information) to the IRM desktop client 136 via network 118 at 532. Turning to 436 in FIG. 4, the IRM desktop client 136 receives the license 165 from the IRM system 112 and decrypts the sealed artifact 134 at 440. Thereafter, the IRM desktop client 136 communicates with the artifact application 132 in any appropriate manner to ensure that the one or more types of access/permissions of the sealed artifact 134 specified in the received license 165 are provided to the user at 444. That is, the artifact application 132, after receiving the appropriate permissions from the IRM desktop client 136, may be responsible for actually opening the sealed artifact 134 for the user.

Among other advantages of the system 100, administrators and artifact content owners may create, modify and/or remove permissions and/or conditions of a sealed artifact 134 on the fly in real time which are automatically applied to all copies of the sealed artifact 134 wherever such copies exist. As merely one example, upon receiving a sealed artifact 134 via email or in other manners, a user may attempt to open the sealed artifact 134 as discussed above (e.g., providing credentials to the IRM desktop client 136 which are passed to the IRM system 112 and eventually the CMS 108). Furthermore, assume the access request is denied because the sealed artifact 134 is disposed in a folder 216 of the workspace 192 that the user does not have access to or is otherwise not associated with (e.g., the sealed artifact 134 is located in a personal folder 216 of another user). However, upon the sealed artifact 134 being moved into a group folder 216 of the workspace 192 that the user is associated with, the user would be immediately granted access to the sealed artifact 134 according to one or more artifact permissions 166 and/or conditions. In this regard, a subsequent access request to the CMS 108 would result in the passing of permission information to the IRM system 112 and eventual receipt of a license 165 at the IRM desktop client 136. Furthermore, it should be appreciated that rights and content management modules 176, 180 of the CMS may be accessible both to any appropriate enterprise administrators or content owners and to any end users with editing/resealing rights.

It will be readily appreciated that many deviations may be made from the specific embodiments disclosed in the specification without departing from the spirit and scope of the invention. For example, it should be understood that the functionalities performed by many of the processes and modules discussed herein may be performed by other modules, devices, processes, etc. The illustrations and discussion herein has only been provided to assist the reader in understanding the various aspects of the present disclosure. As another example, it is envisioned that the client system 104, IRM system 112 and CMS 108 may all communicate via the same network (i.e., the networks 118 and 119 are the same network or part of the same network).

Furthermore, and as discussed previously, embodiments disclosed herein can be implemented as one or more computer program products, i.e., one or more modules of computer program instructions encoded on a computer-readable medium for execution by, or to control the operation of, data processing apparatus. For example, the modules used by the CMS 108 to provide the policy and permission manipulation and analysis, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The system 100 may encompasses one or more apparatuses, devices, and machines for processing data, including by way of example a programmable processor, a computer, or multiple processors or computers. In addition to hardware, the system 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the various artifact rights management processes disclosed herein) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In different embodiments, system 100 (i.e., the one or more client systems 104, IRM systems 112 and CMS 108) may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with the rights and content management modules 176, 180), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

I claim:

1. A method for use in a content management system (CMS), comprising:
    providing a CMS comprising at least one workspace, the at least one workspace including at least one folder for storing artifacts;
    selecting, from the CMS, at least one sealing policy that mandates encryption of at least one artifact of the CMS upon the at least one sealing policy being satisfied;
    disposing an artifact in the at least one folder;
    determining, with a policy manager associated with a processor on a computer system, whether the at least one sealing policy has been satisfied; and
    sending, from the CMS, a request to an information rights management (IRM) system to seal the artifact in response to a determination that the at least one sealing policy has been satisfied.

2. The method of claim 1, wherein the at least one sealing policy is satisfied by virtue of the artifact being disposed in the folder.

3. The method of claim 2, wherein the at least one sealing policy is satisfied upon the artifact including a particular file name.

4. The method of claim 1, further comprising:
receiving, from the IRM system, the artifact, wherein the artifact is sealed; and
disposing, the sealed artifact in the folder.

5. The method of claim 4, further comprising:
associating at least one first type of use of the artifact and/or at least one condition that must be satisfied for the at least one first type of use with one or more users associated with the at least one workspace, wherein the at least one first type of use or condition applies to the artifact and at least substantially all copies of the artifact.

6. The method of claim 5, wherein the at least first type of use comprises the ability to:
read the artifact only, edit the artifact, update a sealed version of the artifact, print the artifact, forward the artifact, and/or delete the artifact.

7. The method of claim 5, wherein the at least one condition comprises:
signing, by the one or more users, a non-disclosure agreement with respect to information contained in the artifact; and/or
requesting, by the one or more users from the content management system, an updated version of the artifact upon an attempted use by the one or more users of a version of the artifact that is older than the updated version.

8. The method of claim 5, wherein the associating comprises:
first associating at least one first type of use of the artifact and/or at least one condition that must be satisfied for the at least one first type of use with a first user associated with the CMS; and
second associating at least one first type of use of the artifact and/or at least one condition that must be satisfied for the at least one first type of use with a second user associated with the CMS that is different than that for the first user.

9. The method of claim 5, further comprising after the associating at least one first type of use of the artifact and/or at least one condition that must be satisfied for the at least one first type of use with one or more users associated with the at least one workspace:
associating at least one second type of use of the artifact and/or at least one condition that must be satisfied for the at least one second type of use with one or more users associated with the at least one workspace, wherein the at least one second type of use or condition applies to the artifact and at least substantially all copies of the artifact, wherein the at least one first type of use or condition is different than the at least one second type of use or condition.

10. The method of claim 4, wherein the sealing request includes a unique identifier for the artifact; wherein the received sealed artifact comprises the unique identifier embedded therein.

11. The method of claim 4, wherein the disposing comprises:
moving the artifact from a second folder of the first workspace to the first folder.

12. The method of claim 4, further comprising:
deleting the sealed artifact from the first folder, wherein the deleting limits access to the artifact and at least substantially any copies of the artifact.

13. A method for use with a content management system (CMS), comprising:
receiving, at an information rights management (IRM) server, a request for access to an artifact from a user at a client device, the request including a user ID of the user and a unique identifier of the artifact;
validating that the user ID is associated with a user in an enterprise directory of a CMS;
forwarding, from the IRM server, the user ID and the unique identifier to the CMS;
receiving, from the CMS, information related to at least one type of use of the artifact and/or at least one condition that must be satisfied for the at least one type of use associated with the user ID;
generating a license for use of the artifact with the artifact, the license associating the information with the user ID and the unique identifier; and
forwarding, from the IRM server, the license to the client device.

14. The method of claim 13, further comprising after the forwarding the license to the client device:
receiving, from the client device, a subsequent request for access to the artifact, the subsequent request including the user ID and the unique identifier;
forwarding the user ID and the unique identifier to the CMS; and
receiving, from the CMS, subsequent information related to at least one type of use of the artifact and/or at least one condition that must be satisfied for the at least one type of use associated with the user ID, wherein the subsequent information is different than the information.

15. The method of claim 14, wherein the information is related to granting or denying at least one type of access of the artifact, and the subsequent information is related to the other of granting or denying the at least one type of access of the artifact.

16. The method of claim 13, wherein the information stipulates that the user may perform one or more of reading, editing, printing, copying and saving the artifact.

17. The method of claim 13, wherein the information stipulates that before the user may access the artifact, the user must perform at least one of:
signing a non-disclosure agreement with respect to content of the artifact, and
requesting, from the CMS, an updated version of the artifact upon an attempted use by the user of a version of the artifact that is older than the updated version.

18. A content management system (CMS) for use in granting access to an artifact of an enterprise, comprising
a processor;
a content management module run by the processor, the content management module comprising at least one workspace, the at least one workspace including:
at least one folder for storing artifacts;
at least one sealing policy that mandates encryption of at least one artifact of the at least one workspace by an information rights management (IRM) system upon the at least one sealing policy being satisfied; and
at least one permission that sets forth at least one type of use of at least one sealed artifact of the at least one workspace by one or more users of the enterprise.

19. The CMS of claim 18, further comprising a rights management module run by the processor, the rights management module including:
a policy manager for use in determining whether the at least one sealing policy has been satisfied; and
a permission manager for use in determining whether one or more users of the enterprise has access to at least one sealed artifact of the content management module.

20. The CMS of claim 19, further comprising:
a web service client for communicating with the IRM system; and
a CSI layer that operates as a mediator between the web service client and the content management module.

\* \* \* \* \*

UNITED STATES PATENT AND TRADEMARK OFFICE
CERTIFICATE OF CORRECTION

PATENT NO. : 8,528,099 B2  
APPLICATION NO. : 13/015220  
DATED : September 3, 2013  
INVENTOR(S) : Venkata Naga Ravi Page 1 of 1

It is certified that error appears in the above-identified patent and that said Letters Patent is hereby corrected as shown below:

On Title Page, Item (56), column 2, under other publications, line 6, delete "Doumentum" and insert -- Documentum --, therefor.

In the Specification

In column 1, line 63, delete "documents" and insert -- documents. --, therefor.

In column 12, line 53, delete "team)" and insert -- team). --, therefor.

In column 13, line 9, delete "edited" and insert -- edited. --, therefor.

In column 18, line 56, delete "be" and insert -- by --, therefor.

Signed and Sealed this  
Twenty-fourth Day of December, 2013

Margaret A. Focarino  
*Commissioner for Patents of the United States Patent and Trademark Office*